United States Patent
Liang et al.

(10) Patent No.: US 10,503,710 B2
(45) Date of Patent: Dec. 10, 2019

(54) WEBPAGE PRE-READING METHOD, APPARATUS AND SMART TERMINAL

(71) Applicant: GUANGZHOU UCWEB COMPUTER TECHNOLOGY CO., LTD, Guangzhou (CN)

(72) Inventors: Jie Liang, Guangzhou (CN); Yuxin Jiang, Guangzhou (CN); Wenqing Yao, Guangzhou (CN); Huocheng Wu, Guangzhou (CN); Yanwei Xu, Guangzhou (CN)

(73) Assignee: GUANGZHOU UCWEB COMPUTER TECHNOLOGY CO., LTD, Guangzhou (CN)

( * ) Notice: Subject to any disclaimer, the term of this patent is extended or adjusted under 35 U.S.C. 154(b) by 648 days.

(21) Appl. No.: 15/210,979

(22) Filed: Jul. 15, 2016

(65) Prior Publication Data
US 2017/0024423 A1    Jan. 26, 2017

(30) Foreign Application Priority Data
Jul. 20, 2015    (CN) .......................... 2015 1 0426888

(51) Int. Cl.
*G06F 16/20* (2019.01)
*G06F 16/215* (2019.01)
*G06F 16/24* (2019.01)
*G06F 16/2457* (2019.01)
*G06F 16/957* (2019.01)

(52) U.S. Cl.
CPC ............ *G06F 16/215* (2019.01); *G06F 16/24* (2019.01); *G06F 16/24578* (2019.01); *G06F 16/9574* (2019.01)

(58) Field of Classification Search
None
See application file for complete search history.

(56) References Cited

U.S. PATENT DOCUMENTS

| | | | |
|---|---|---|---|
| 2011/0246406 A1* | 10/2011 | Lahav | G06Q 30/02 706/46 |
| 2014/0095966 A1* | 4/2014 | Burkard | G06F 16/9574 715/205 |
| 2015/0088662 A1* | 3/2015 | Noller | G06Q 30/02 705/14.66 |
| 2015/0193395 A1 | 7/2015 | Nicolaou | |
| 2019/0163671 A1* | 5/2019 | Vengerov | G06F 16/176 |

FOREIGN PATENT DOCUMENTS

| | | |
|---|---|---|
| CN | 102254004 A | 11/2011 |
| CN | 102663012 A | 9/2012 |
| CN | 102737037 A | 10/2012 |
| CN | 104298780 A | 1/2015 |

* cited by examiner

*Primary Examiner* — Belix M Ortiz Ditren
(74) *Attorney, Agent, or Firm* — Anova Law Group PLLC (57) ABSTRACT

A method is provided for webpage pre-reading. The method includes obtaining visiting information during a period of time for multiple webpages of each user from a plurality of users including a current user; determining respective similarity values between the current user and the plurality of users based on the visiting information; determining one or more most-similar users based on the similarity values; and when the current user is browsing a current webpage, predicting a target webpage to be accessed by the most-similar users as a target webpage for the current user and pre-reading the target webpage.

20 Claims, 6 Drawing Sheets

WEBPAGE PRE-READING METHOD, APPARATUS AND SMART TERMINAL

CROSS-REFERENCES TO RELATED APPLICATIONS

This patent application claims priority of Chinese Patent Application No. 201510426888.X, filed on Jul. 20, 2015, the entire content of which is incorporated by reference herein.

TECHNICAL FIELD

The disclosed subject matter generally relates to the field of web browser technology and, more particularly, relates to a webpage pre-reading method, apparatus and smart terminal thereof.

BACKGROUND

With the widespread of the Internet, computer becomes an essential equipment in either home environment or work environment. Using a browser on a computer to access the Internet becomes more frequent to people. In particular, with the rapid popularization of smart terminals such as smart phones and tablet PCs, using a terminal browser to access the Internet becomes routine behavior for many people. When a user uses a browser on a smart terminal to open a webpage, if the wireless network speed is limited, or if the performance of the smart terminal is limited, it may be very time consuming to open the webpage, and the user to wait for the webpage, affecting the user experience. A key factor that affects the time efficacy for opening a webpage is that the downloading time of the webpage content is too long.

Currently, a webpage pre-reading method is generally used on potential webpages to realize the fast opening of a webpage by the user. When a user is browsing a current webpage, the webpage pre-reading method can determine one or more next webpages that are potentially to be accessed by the user from the server side. After the determination, the related data and resources of the one or more next webpages can be pre-read to a local cache before the user accessing the one or more next webpages. In response to receiving an indication that one webpage is requested by the user, the related data can be read from the local cache and the requested webpage can be presented to the user directly. The webpage pre-reading method can avoid a waiting process for downloading the webpage, and thereby shorten the response time of a webpage access operation performed by a user.

There are two types of existing webpage pre-reading method. The first one can determine one or more keywords on the current page that indicate one or more next webpages that are potentially to be accessed, such as "next page," etc. Then data and resources of the one or more next webpages can be pre-read from one or more links corresponding to the one or more keywords to the local cache. The second one can obtain webpage list from the server side, and then sequentially pre-read the data and resources of multiple webpages in the webpage list to the local cache.

However, the existing webpage pre-reading method may have certain problems. The first type webpage pre-reading method is only suitable for some special webpages that are linked by multiple hyperlinks. For those webpages do not have page order, such as news pages, the first type webpage pre-reading method cannot predict a next webpage that is likely to be browsed by a user, therefore cannot speedup the displaying of the webpage. The second type webpage pre-reading method requests pre-reading a large amounts of data of multiple webpages potentially to be browsed, which may seriously occupy the spaces of the local cache, and may even result in insufficient cache space, thereby slow down the performance of the smart terminal.

Accordingly, the present disclosure provides a webpage pre-reading method, an apparatus and a smart terminal thereof to at least partially alleviate one or more problems set forth above and to solve other problems in the art.

BRIEF SUMMARY

In accordance with some embodiments of the disclosed subject matter, a webpage pre-reading method, an apparatus and a smart terminal thereof are provided.

An aspect of the present disclosure provides a method for webpage pre-reading. The method includes obtaining visiting information during a period of time for multiple webpages of each user from a plurality of users including a current user; determining respective similarity values between the current user and the plurality of users based on the visiting information; determining one or more most-similar users based on the similarity values; and when the current user is browsing a current webpage, predicting a target webpage to be accessed by the most-similar users as a target webpage for the current user and pre-reading the target webpage.

Another aspect of the present disclosure provides an apparatus for webpage pre-reading. The apparatus includes an information obtaining module, a determination module, an analysis module, and a first pre-reading module. The information obtaining module is configured for obtaining visiting information during a period of time for multiple webpages of each user from a plurality of users including a current user. The determination module is configured for determining respective similarity values between the current user and the plurality of users based on the visiting information, and determining one or more most-similar users based on the similarity values. The analysis module is configured for, when the current user is browsing a current webpage, predicting a target webpage to be accessed by the most-similar users as a target webpage for the current user. The first pre-reading module is configured for pre-reading the target webpage.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solutions of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides a webpage pre-reading method, an apparatus and a smart terminal thereof.

Figure 1:
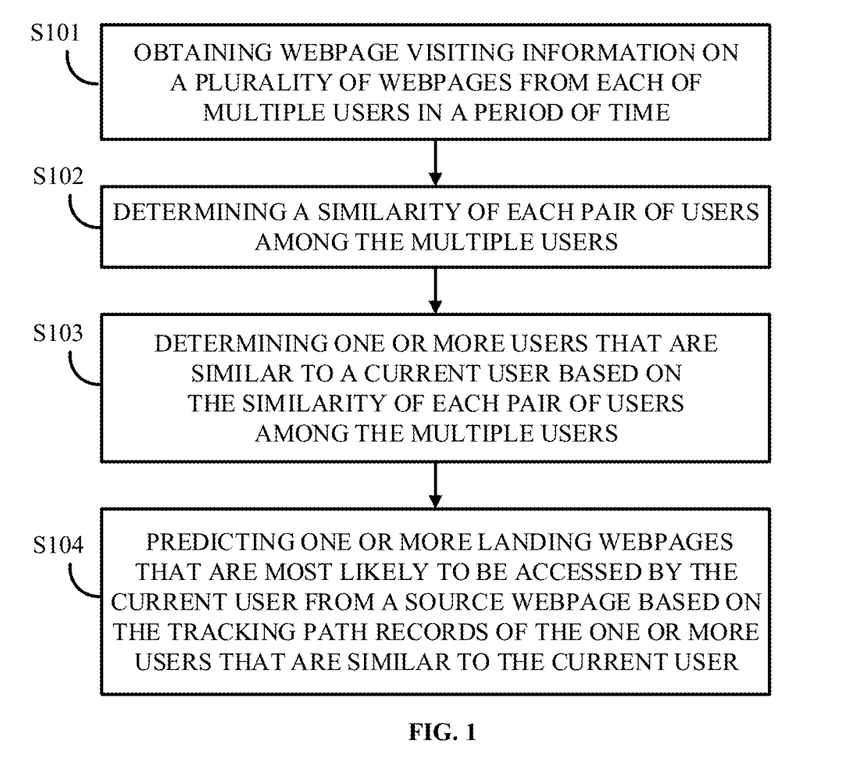
FIGS. 1-2 are flowcharts of an exemplary method for webpage pre-reading in accordance with some embodiments of the disclosed subject matter.
Figure 2:
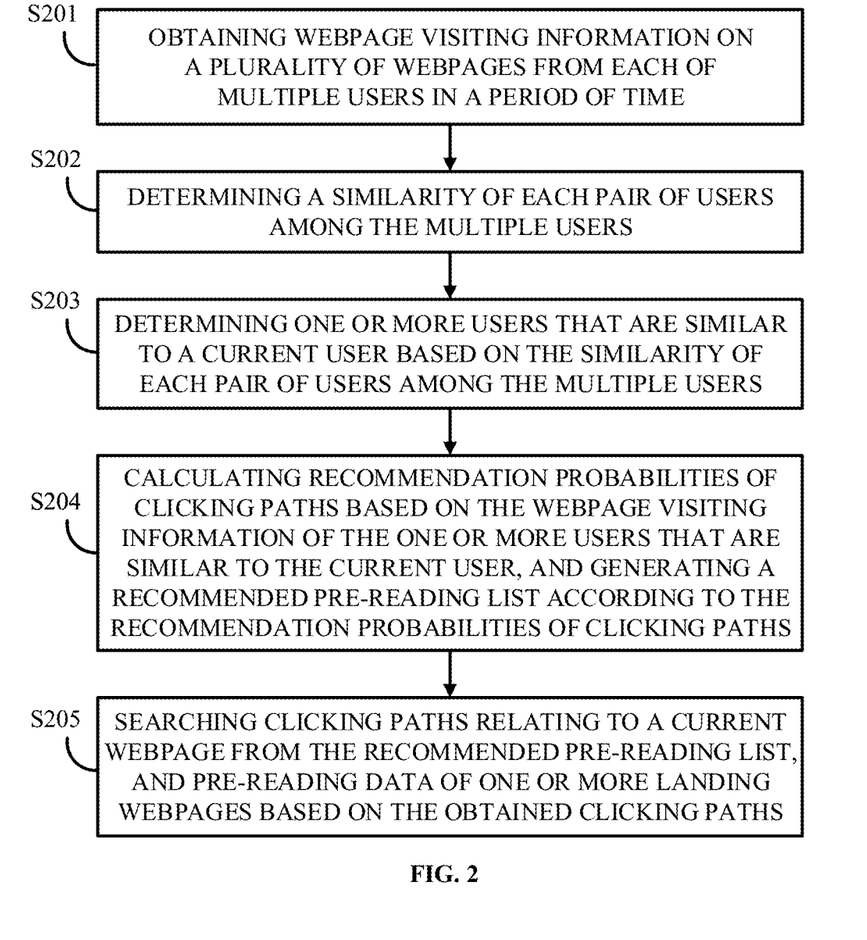

Referring to FIGS. 1-2, flowcharts of exemplary processes of a method for webpage pre-reading are shown in accordance with some embodiments of the disclosed subject matter. As illustrated in FIG. 1, the method can include the following steps.

Step S101: Obtaining webpage visiting information on a plurality of webpages from each of multiple users in a period of time.

The webpage visiting information can include any suitable data, such as visiting numbers of each webpage for each user, visiting duration time of each webpage for each user, IP address of each webpage, user information associated with each webpage, etc.

In some embodiments, the webpage visiting information can be obtained from internet log documents stored in the multiple users' terminals, or can be obtained from internet log documents stored in the servers. In one embodiment, the webpage visiting information is obtained from internet log documents stored in the servers.

If the obtained webpage visiting information does not contain numbers of visits of each webpage or visiting duration time of each webpage, the method can also include, after obtaining information of all the webpages, calculating the numbers of visits of each webpage and recording visiting duration time of each webpage based on the webpage visiting information for each user.

The webpage visiting information can be obtained by using any suitable technique, such as the method disclosed by Chinese patent application publication No. 201310364722.0 published on Dec. 11, 2013, or the method disclosed by Chinese patent application publication No. 201510038747.0 published on Apr. 15, 2015.

The period of time used herein can be determined by actual situation. For example, the period of time can be set as multiple hours, such as 12 hours, 24 hours, 30 hours, 36 hours, 72 hours, etc.

In some embodiments, during the process of obtaining webpage visiting information from each of multiple users in a period of time, a data cleaning process can be performed for screening the webpage visiting information.

Typically, a large amount of data is recorded in the internet log documents in either local terminals, or remote servers. Such data can include many non-network request data, non-standard data, non-master document request data, inconsistent data, irrelevant data, etc. For example, the log data may include information about user IP addresses, user IDs, requested Uniform Resource Identifier (URL) accesses, request methods, access time, transmission protocols, numbers of bytes transferred, error codes, user proxy, and any other attributes. As another example, an one-time webpage request might cause a browser to automatically download multiple files, such as multiple images. All downloaded files constitute a webpage, so an one-time webpage request can correspond to multiple log records.

Therefore, the data cleaning process is necessary to be performed to clean some irrelevant data from the log data recorded in log documents. For example, URL extensions can be cleaned up. In generally websites, only the body of webpages are related to user queries, while some image type files with extensions gif, jpg, etc., and some script type files with extensions js, cgi, css, etc., are not related to user queries. Normally, a user query of a webpage does not specifically request all image type files and script type files of the webpage. In log documents, image type files and script type files are ancillary files of the web framework configuration. The image type files and script type files are normally automatically downloaded, and cannot truly reflect user browsing behavior, the data relating to the image type files and script type files can be removed during the data cleaning process.

By using the data cleaning technique, data irrelevant to the user query can be removed, and suitable webpage visiting information can be obtained for subsequent analysis. Therefore, accurate statistical results and reliable data analysis results can be achieved, and the amount of data to be calculated can also be reduced.

Step S102: Determining a similarity value of each pair of users among the multiple users.

When a webpage is opened in a PC browser or a mobile terminal browser, multiple elements that constitute the webpage can be presented in a user interface of the PC browser or the mobile terminal browser. The multiple elements that constitute a webpage can include texts, images, audios, and videos, etc. These elements also include hyperlinks. When a visitor clicks on a hyperlink on one webpage, the connection can automatically jump to a target of the link, often another webpage.

The information about webpages visiting through Internet for each user can be recorded in a browsing log document in client terminals by a browser. The visiting information of a webpage can include visiting time (including a start visiting time of the webpage and an end visiting time of the webpage), a URL address of the webpage, delivered content types, etc.

For a distinguishing purpose, a webpage that contains a link corresponding to another webpage is defined a current webpage, or a source page, or a first page, while the webpage that corresponds to the link contained in the current webpage is defined a next page, or a target page, or a second page. A clicking path is a path from clicking on a current page to accessing a next page. Normally, a tail of the clicking path is the current page, and a head of the clicking path is the next page.

When a user accesses a next page (or a second page) multiple times through a clicking path from a current page (or a first page) in a period of time, a number of the accesses through the clicking path can be recorded in the log document.

For example, in 12 hours, a user may, at different time, access the Sports webpage from the Information Center webpage (the first webpage) on the UC browser homepage by clicking on the link to the Sports webpage (the second webpage), and the number of clicks is 3. Similarly, the user accesses the Entertainment webpage and the number of clicks is 6; the user also accesses the Finance webpage and the number of clicks is 4. Thus, a clicking path is formed from the Information Center webpage to the Sports webpage, and the number of clicks of this clicking path is 3; a clicking path is formed from the Information Center webpage to the Entertainment webpage, and the number of clicks of this clicking path is 6; a clicking path is formed from the Information Center webpage to the Finance webpage, and the number of clicks of this clicking path is 4.

A similarity value of two users can be calculated using any suitable method. In some embodiments, a similarity value of each pair of users among the multiple users can be calculated by using a cosine similarity method. An eigenvector can be used for representing accessing numbers of multiple webpages of a user in a period of time. For example, supposing a user has visited number m of different webpages, the eigenvector of this user is an m-dimensional array: {w1, w2, ... wi ..., wm}, where wi is an accessing number of the i-th webpage.

Therefore, an eigenvector array can be built for representing accessing numbers of different webpages of multiple users in a same period of time. If a total number of the different webpages is n, then the eigenvector array is n-dimensional. All the eigenvectors in the eigenvector array are lined up in a sequence as any suitable order, such as an order sorting by strings. An eigenvalue corresponding to a webpage that is not visited by a user can be assigned as a value of 0. For example, if there are 5 URL addresses corresponding to 5 different webpages u1, u2, u3, u4, and u5, respectively, and user A visits u1 and u3 one time for each, user B visits u2 and u3 one time for each. Then an eigenvector for user A can be represented as [1, 0, 1, 0, 0], and an eigenvector for user B can be represented as [0, 1, 1, 0, 0].

In some embodiments, a formula to calculate the cosine similarity of two eigenvectors is shown as the following:

$$\cos\theta = \frac{\sum_{i=1}^{n}(A_i \times B_i)}{\sqrt{\sum_{i=1}^{n}(A_i)^2} \times \sqrt{\sum_{i=1}^{n}(B_i)^2}}$$

Where A represents the eigenvector of the user A [A1, A2, ..., An], B represents the eigenvector of the user B [B1, B2, ... Bn], and n represents the number of dimensions.

If the cosine value of two eigenvectors of two users is close to 1, that indicates an angle between the two eigenvectors is close to 0 degree, which means that the similarity value of the two users has a high level. On the contrary, if the cosine value of two eigenvectors of two users is close to 0, that indicates an angle between the two eigenvectors is close to 90 degree, which means that the similarity value of the two users has a low level. Other similarity calculation methods may also be used.

The above formula may require a large amount of calculation. In order to reduce the amount of calculation, before calculating the similarity value of each pair of users among the multiple users, a user screening process can be performed.

For example, some users that have a small webpage visiting number during the period of time can be filtered. In other words, the users corresponding to a relatively small number of times for visiting different clicking paths may not be included in the similarity calculation. Because these users either use Internet infrequently, or concern about a small portion of content on the Internet, are not recommended as suitable users for the similarity value calculation. Therefore, a total webpage visiting number of a user can be compared with a preset webpage visiting threshold number. If the total webpage visiting number of a user is less than the preset webpage visiting threshold number, the user may by filtered. The preset webpage visiting threshold number can be determined based on any suitable factors, such as the length of the period of time, the total number of users in the period of time, etc.

As another example, before calculating a similarity value between two users, common characteristics between the two users can be considered. If any two users do not have any common characteristics between the two users, the similarity value may be low, and such similarity may be unnecessary to calculate. The characteristic may include any suitable attribution or activity among the users. For example, if two or more users have all visited a same webpage, the same webpage is one common characteristic between the two or more users. That is, the same webpage visited by multiple users can be used as a common characteristics. In some embodiments, an inverted list can be constructed by using the user visiting the webpage as the primary key and the same webpage (common characteristics) visited by multiple users as the secondary key. So the similarity value between any pair of users in the inverted list can be calculated using the above cosine similarity calculation method.

In some embodiments, if a total number of users in an inverted list exceeds a threshold user number, it can be considered that the distinction of users based on the common characteristic is not enough. So that the inverted list using the common characteristic as the secondary key can be filtered. The threshold user number can be determined based on any suitable factors, such as the length of the period of time, the total number of users in the period of time, etc.

In some other embodiments, the Wilson interval formula can be used to calculate a confidence interval for a visiting number of a webpage. During the calculation process for the cosine similarity value of each pair of users among the multiple users, an eigenvector is generated for each user to represent the visiting numbers to different webpages in a same period of time. Based on the webpage visiting data obtained from the data cleaning process, the visiting number of each webpage for each user during the period of time can be normalized. Then the normalized visiting numbers can be used for calculating Wilson intervals based on a certain confidence degree. A low limit of the confidence interval can be used as the value of the visiting number of the webpage. So that the reliability of the eigenvectors can be ensured.

Step S103: Determining one or more users that are similar to the current user or a selected user based on the similarity value of each pair of users among the multiple users according to a certain predicting algorithm.

Based on the similarity values calculated for each pair of users among the multiple users, a user that has a maximum value of the similarity of the current user or the selected user can be determined. In some embodiments, in order to have an improved chance to pre-read a target webpage from the current webpage browsed by the user based on similar users, several users can be determined from the multiple users according to a descending order of the calculated similarity values. For example, according to the ranking of the similarity values from the largest to the smallest, two users, three users, four users, or even more users that are the most similar to the current user can be selected. In some embodiments, a similarity threshold value can be determined based on any suitable factors, such as the length of the period of time, the total number of users in the period of time, etc. The users having a similarity value less than the similarity threshold value can be filtered.

Step S104: Predicting one or more target webpages that are most likely to be accessed by the current user from a source webpage based on the clicking path records of the one or more users that are most similar to the current user, and pre-reading the predicted one or more target webpages.

In some embodiments, the predicting process can be performed using any suitable predicting algorithms, such as the predicting algorithm disclosed by Chinese patent application publication No. 201110165459.3 published on Oct. 19, 2011, the predicting algorithm disclosed by Chinese patent application publication No. 201110086435.9 published on Oct. 17, 2012, the predicting algorithm disclosed by Chinese patent application publication No. 201310743798.4 published on Apr. 16, 2014, and the predicting algorithm disclosed by Chinese patent application publication No. 201310743898.7 published on Apr. 14, 2014, etc.

When the current user is viewing the current webpage or the first webpage, a clicking path using the current webpage or the first webpage as the source webpage of the one user that is the most similar to the current user can be determined. That is, the target webpage or the second webpage to be clicked from the current webpage or the first webpage can be determined. In some embodiments, in order to ensure the accuracy of pre-reading the target webpage, multiple target webpages may be determined, such as 2, 3, 4 or more target webpages. The determined target webpages can be pre-read and stored to a local cache.

If the user does not request a next webpage but directly stops browsing the Internet, such as closes the browser, the stored data of the one or more pre-read target webpages can be released to avoid occupying spaces of the local cache by unused pre-read webpage data.

Accordingly, the disclosed method for webpage pre-reading can obtaining webpage visiting information from multiple users in a period of time, determining a similarity value of each pair of users among the multiple users, determining one or more users that are similar to the current user based on the similarity value of each pair of users among the multiple users, and predicting one or more target webpages that are most likely to be accessed by the current user from a source webpage based on the clicking path records of the one or more users that are similar to the current user. Based on the operations, the data of webpages to be visited by the user can be pre-read. A high accuracy and a high efficiency of the pre-reading can be ensured. After the data of webpages that have highly probabilities to be accessed being stored into a local cache, a speed for the user to open the webpages can be greatly enhanced, so that the user experience can be improved.

The method can be implemented by combining any suitable embodiments described above, thereby can greatly improve the hit probability and coverage of the predated target webpages, and ensures a high accuracy and high effectiveness of the webpage pre-reading. By pre-reading and storing the data of webpages that have highly probabilities to be accessed by the current use to a local cache, a speed for the current user to open webpages is greatly enhanced, so that the user experience can be improved.

Referring to FIG. 2, a flowchart of another exemplary processes of the method for webpage pre-reading is shown in accordance with some embodiments of the disclosed subject matter. As illustrated, the method can include the following steps.

Step S201: Obtaining webpage visiting information on a plurality of webpages from each of multiple users in a period of time.

Step S202: Determining a similarity value of each pair of users among the multiple users.

Step S203: Determining one or more users that are most similar to the current user based on the similarity value of each pair of users among the multiple users according to a certain predicting algorithm.

The above steps S201-S203 can be implemented as the same as the steps S101-S103 described above in connection with FIG. 1. Any suitable embodiments included in steps S101-S103 can be referred and combined herein.

Step S204: Calculating the recommendation probabilities of clicking paths based on the webpage visiting information of the one or more users that are most similar to the current user, and generating a pre-reading list according to the recommendation probabilities of clicking paths.

For the current user, during the process of calculating recommendation probabilities of clicking paths based on the webpage visiting information of the one or more users that are most similar to the current user, an accessing number from the first webpage (or a source webpage) to the second webpage (or a target webpage) for a most-similar user can be accounted. A product of the accessing number times a similarity value between the current user and the most-similar user can be used as a recommendation probability of the clicking path from the first webpage (or a source webpage) to the second webpage (or a target webpage) of the most-similar user.

If there are multiple users that are most similar to the current user, a recommendation probability of the clicking path from the first webpage to the second webpage of each of the multiple users can be calculated, and the calculated recommendation probability of each user is added together to be the final recommendation probability of the clicking path from the first webpage to the second webpage. Further, the recommendation probability of each of the multiple clicking paths visited by the one or more most-similar users during the period of time can be calculated. Thus, each clicking path can have a corresponding recommendation probability.

For example, after similarity values of each pair of users are calculated, assuming the similarity between user a and user b is sim1, the similarity between user a and user c is sim2, and the similarity between user a and user d is sim3, when the number of clicks of the clicking path p->z of user b in a period of time is n, the number of clicks of the clicking path p->z of user c in the period of time is m, and the number of clicks of the clicking path p->z of user d in the period of time is k, the recommendation probability of the clicking path p->z for user a is equal to $n*sim1+m*sim2+k*sim3$. If there are multiple clicking paths that are visited by user a in the period of time, the recommendation probability can be calculated respectively for each clicking path by using the same method.

As described above, one or more most-similar users are used to provide the current user with the recommendation probability of the clicking paths, to reduce the unnecessary data calculation amount. In some other embodiments, all of the similar users (not just the most-similar users) may be included in the process for calculating the recommendation probabilities of clicking paths. However, because a recommendation probability calculated based on a user that has a low similarity value is also low, it might not efficient to include all similar users. In order to reduce the amount of calculation, during the step S203, the similarity threshold value can be preset to filter out the users that has a similarity value less than the similarity threshold value to determine the one or more most-similar users. The similarity threshold value can be set to different values based on any suitable factors, such as the length of the period of time, and the total number of users, etc.

In some other embodiments, in order to reduce the amount of calculation, during the process of calculating recommendation probabilities of clicking paths, some licking paths that have a small number of visits from the source webpage to the target webpage in the period of time can be filtered, i.e., the recommendation probability of the clicking path with a small number of clicks is not calculated. Since a clicking path with a small number of visits in the period of time has a small recommendation probability, it can be excluded to the calculation process. A clicking-number threshold can be set in advance to filter out those clicking paths with the number of clicks lower than the clicking-number threshold. The clicking-number threshold may be determined based on any suitable factors, such as the length of the period of time, the total number of users, etc.

In some other embodiments, during the process of calculating recommendation probabilities of clicking paths based on the most-similar users, the Wilson interval formula can be used to calculate a confidence interval for the number of visits of a webpage. A lower limit of the confidence interval can be used as the final value of the number of visits of the webpage for improving the statistical reliability of the number of visits of the webpage.

To generate the pre-reading list, the recommendation probabilities are ranked based on their values to put together the multiple clicking paths from the source webpage to the target webpage into a list. That is, the multiple clicking paths is listed in order in the pre-reading list based on the recommendation probabilities. Of course, the multiple clicking paths can also be listed without any order, in which case the speed of pre-reading may be affected under certain circumstance. In one embodiment, the multiple clicking paths can be ranked in a descending order of the recommendation probability of each clicking path. Other ranking methods for fast pre-reading webpages may also be used.

In some other embodiments, if a total number of the clicking paths is a large number, some clicking paths that have a low recommendation probability can be filtered to reduce the amount of calculation. Also, the data of webpages that are not likely to be accessed by the current user may not be downloaded and stored in the local cache, so the space resource of the local cache can be stored. In order to reduce the amount of calculation, before or during the process for generating the pre-reading list, the clicking paths that has a recommendation probability lower than a recommendation probability threshold can be filtered. The recommendation probability threshold can be determined based on any suitable factors, such as the length of the period of time, and the total number of users, etc.

Step S205: Searching the clicking paths of a current webpage in the pre-reading list, and pre-reading data of one or more target webpages to be browsed based on the obtained clicking paths.

When a user is browsing a current webpage, clicking paths having the current webpage as the source webpage can be searched in the pre-reading list, and a click path with the largest recommended probability can be selected to pre-read the corresponding target webpage. In some embodiments, to ensure the accuracy of pre-reading the target webpage to be browsed, multiple target webpages to be browsed can be pre-read based on the recommendation probabilities in a descending order, such as pre-reading 2, 3, 4, or more target webpages, and the pre-read data of the target webpages can be stored in the local cache.

If the current user does not request a next webpage but directly stops browsing webpages, such as closes the browser, the stored data of the pre-read target webpages can be released to avoid occupying large amount of space in the local cache with unused pre-read webpage data.

Accordingly, using the disclosed method for webpage pre-reading, most-similar users can be determined based on the similarity values of different users, and the recommendation probabilities of the clicking paths can be calculated based on the most-similar users to the pre-reading list. The pre-reading list can be searched to find target webpages to be browsed from the current webpage by the most-similar users, and the corresponding webpage data can be pre-read for the current user. Thus, the coverage and hit-rate of the pre-reading can be improved, and a high accuracy and a high efficiency of the pre-reading can be ensured. After the data of webpages that have highly probabilities to be accessed is stored into a local cache, a speed for the user to open the webpages can be greatly enhanced, improving the user experience.

The method illustrated in FIG. 2 can be implemented by combining any suitable embodiments described above, thereby can greatly improve the hit probability or hit-rate and coverage of the pre-read target webpages, and can further ensure a high accuracy and high effectiveness of the webpage pre-reading and improve the user experience. Further, the various threshold values discussed above can be determined based on any suitable factors, such as the length of the period of time, and the total number of users, etc.

Figure 5:
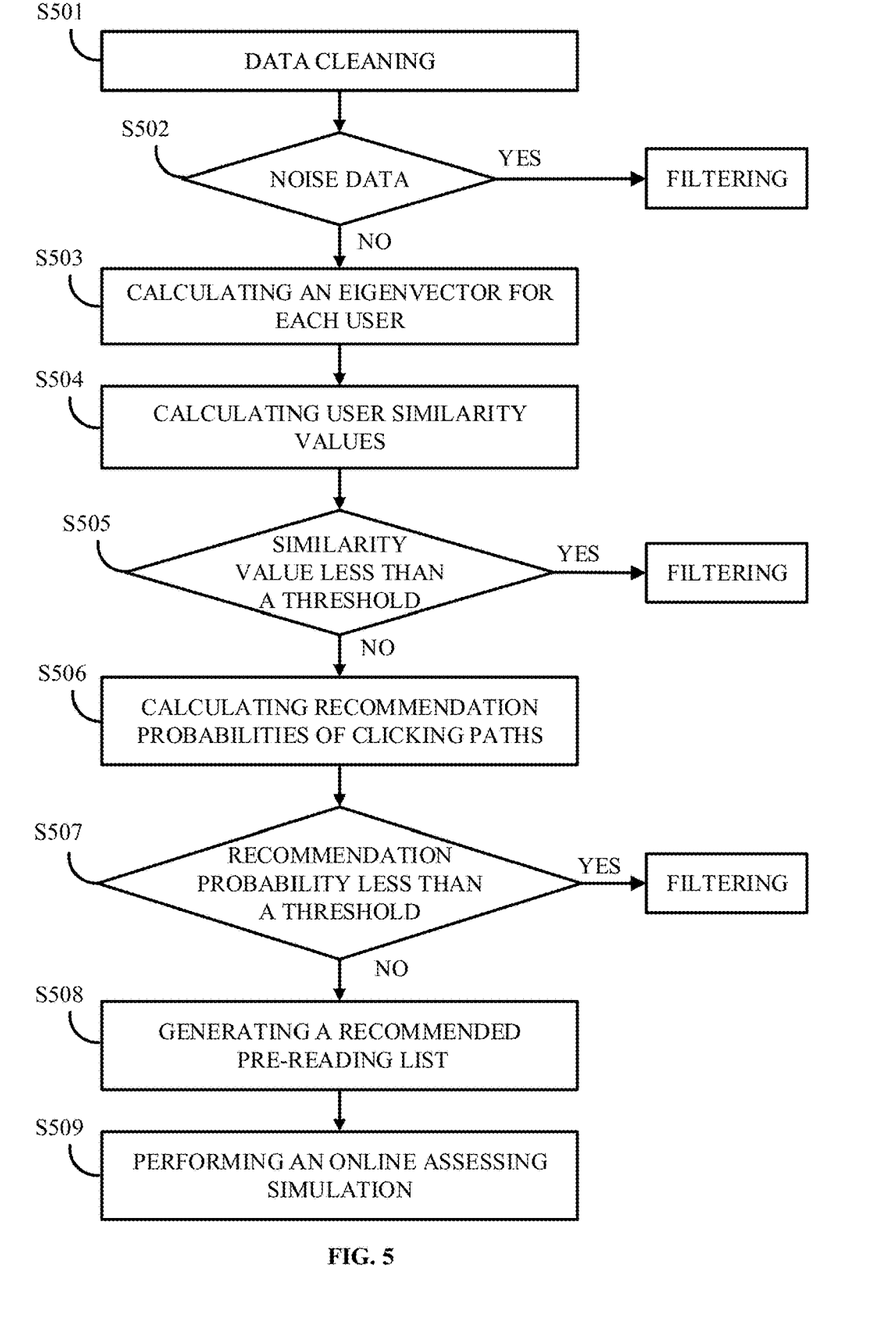
FIG. 5 is a flowcharts of another exemplary method for webpage pre-reading in accordance with some embodiments of the disclosed subject matter.

Referring to FIG. 5, a flowchart of another exemplary processes of the method for webpage pre-reading is shown in accordance with some embodiments of the disclosed subject matter. As illustrated, the method can include the following steps.

At step 501, a data cleaning process can be performed for screening webpage visiting information of a current user and multiple users.

In some embodiments, webpage visiting information during a period of time for a current user can be obtained from a webpage visiting history record document, such as a log document stored in a local terminal of the current user, or a log document stored in a remote server.

A data cleaning process can be perform to screen the obtained webpage visiting information. A detained data cleaning process can be referred to step S101 described above in connection with FIG. 1.

At step S502, whether the webpage visiting information is noise data can be determined. The determination can be performed based on URL request information included in the webpage visiting information. Some data that are irrelevant to URL request information can be treated as noise data.

If the determination indicates that the webpage visiting information is noise data ("YES" at S502), the webpage visiting information can be filtered. If the determination indicates that the webpage visiting information is not noise data ("NO" at S502), an eigenvector for each user can be calculated based on the webpage visiting information at step S503.

Next, at step S504, a similarity value between the current user and each of the multiple users can be calculated based on the eigenvectors of each user. A detailed description for calculating the eigenvector of a user, and for calculating a similarity value between two users can be referred to step S102 described above in connection with FIG. 1.

At step S505, each calculated similarity value can be compared with a preset similarity threshold value. If one similarity value is less than the preset similarity threshold value ("YES" at S505), the data of the user corresponding to the one similarity value can be filtered.

If one similarity value is not less than the preset similarity threshold value ("NO" at S505), the user corresponding to the one similarity value can be regarded as a user most similar to the current user, and the data of the user corresponding to the one similarity value can be used for the following steps.

At step S506, recommendation probabilities of one or more clicking paths that are potentially to be accessed by the current user can be calculated based on the data of the most similar users. A detailed description for calculating a recommendation probability of a clicking path can be referred to step S204 described above in connection with FIG. 2.

At step S507, a recommendation probability of each clicking path can be compared with a preset recommendation probability threshold. If a recommendation probability of one clicking path is less than the preset recommendation probability threshold ("YES" at S307), the data of the one clicking path can be filtered. If a recommendation probability of one clicking path is not less than the preset recommendation probability threshold ("NO" at S307), the data of the one clicking path can be used in the following steps.

At step S508, a pre-reading list can be generated based on the clicking paths that have a recommendation probability larger than the preset threshold probability. A detailed process for generating the pre-reading list can be referred to step S204 described above in connection with FIG. 2.

At step S509, an online assessing simulation can be performed based on the generated pre-reading list. In some embodiments, after getting the pre-reading list, users' log data can be used to assess an effectiveness of the pre-reading list online. A real online assessment may consider the following conditions: a cache size of a user's mobile client, a webpage cache time, a webpage read latency time, a number of webpages for each pre-reading, etc. By setting the various conditions described above, an online assessing simulation can be performed to generate a log document of the current user, including accessing sequence data, a total webpage viewing number, a number of pre-reading webpages, and a hitting number of predicted target webpages.

Two indicators including accurate rate and accessing coverage rate and be calculated. The accurate rate equals to the hitting number of predicted target webpages over the total number of predicted target webpages. The accessing coverage rate equals to the hitting number of predicted target webpages over the total webpage viewing number.

It should be noted that the above steps of the flow diagrams of FIGS. 1, 2 and 5 can be executed or performed in any order or sequence not limited to the order and sequence shown and described in the figure. Also, some of the above steps of the flow diagram of FIGS. 1, 2, and 5 can be executed or performed substantially simultaneously where appropriate or in parallel to reduce latency and processing times. Further, it should be noted that FIGS. 1, 2, and 5 are provided as an example only. At least some of the steps shown in the figures may be performed in a different order than represented, performed concurrently, or altogether omitted.

Figure 3:
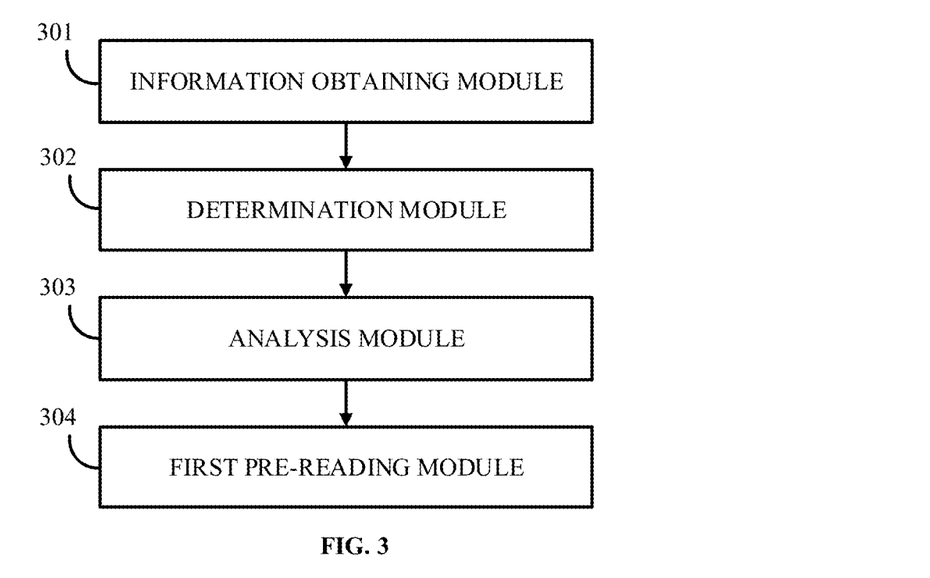
FIGS. 3-4 are schematic structural diagrams of exemplary apparatuses for webpage pre-reading in accordance with some embodiments of the disclosed subject matter.

Referring to FIG. 3, a schematic structural diagrams of an exemplary apparatus for webpage pre-reading is shown in accordance with some embodiments of the disclosed subject matter. As illustrated, the apparatus for webpage pre-reading can include an information obtaining module 301, a determination module 302, an analysis module 303, and a first pre-reading module 304.

The information obtaining module 301 is configured for obtaining webpage visiting information on a plurality of webpages from each of multiple users in a period of time.

The determination module 302 is configured for determining a similarity value of each pair of users among the multiple users, and for determining one or more most-similar users based on the similarity of each pair of users among the multiple users.

The analysis module 303 is configured for, when the current user is browsing the current webpage, predicting one or more target webpages to be accessed from the current webpage by the most-similar users according to a certain predicting algorithm.

The first pre-reading module 304 is configured for pre-reading the data of the predicted one or more target webpages to be accessed. The details on the functionalities of these modules and interactions among the modules may refer to various embodiments described above.

Further, the information obtaining module 301 includes a preprocessing module configured for performing a data cleaning process to screen the webpage visiting information. The determination module 302 includes a similarity calculation module configured for using a cosine similarity method to calculate a similarity value of each pair of users among the multiple users.

Further, the determination module 302 includes a filter module for filtering users that have a total webpage visiting number less than a preset webpage visiting threshold number. The determination module 302 includes an inverted list generating module configured for generating an inverted list using a common webpage that is visited by multiple users as a common characteristic.

Further, the determination module 302 includes a most-similar user determination module configured for determining one or more most-similar users by filtering out the users that has a similarity value less than a similarity threshold value.

Accordingly, using the disclosed apparatus for webpage pre-reading, most-similar users can be determined based on the similarity values of different users, and the target webpages to be browsed from the current webpage by the most-similar users can be determined using a predicting algorithm, and the corresponding webpage data can be pre-read for the current user. Thus, the coverage and hit-rate of the pre-reading can be improved, and a high accuracy and a high efficiency of the pre-reading can be ensured. After the data of webpages that have highly probabilities to be accessed is stored into a local cache, a speed for the user to open the webpages can be greatly enhanced, improving the user experience.

The apparatus illustrated in FIG. 3 can implement any suitable embodiment or combination of embodiments described above, thereby can greatly improve the hit probability and coverage of the predated target webpages, and ensures a high accuracy and high effectiveness of the webpage pre-reading, improving the user experience.

Figure 4:
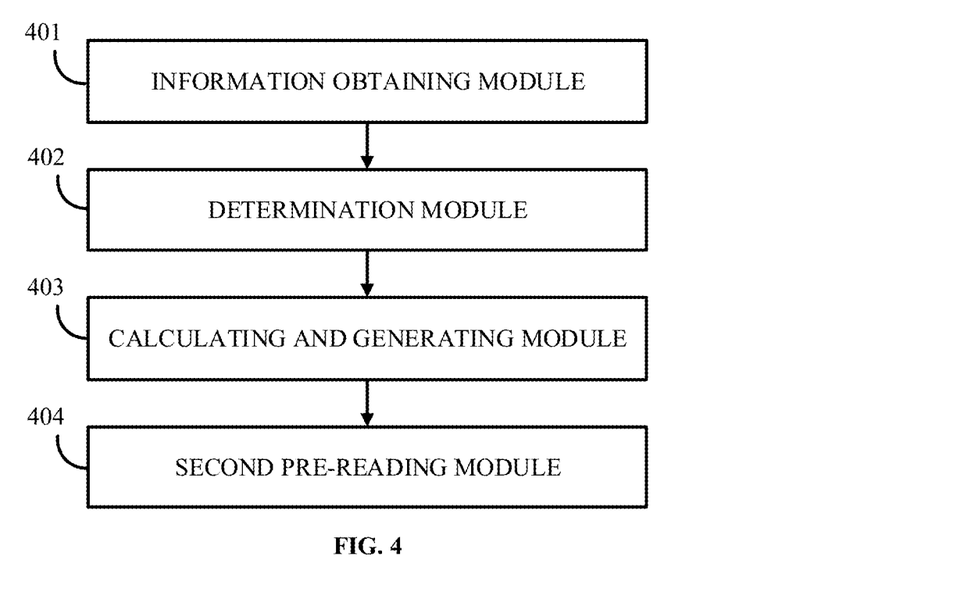

Referring to FIG. 4, a schematic structural diagrams of another exemplary apparatus for webpage pre-reading is shown in accordance with some embodiments of the disclosed subject matter. As illustrated, the apparatus for webpage pre-reading can include an information obtaining module 401, a determination module 402, a calculating and generating module 403, and a second pre-reading module 404.

The information obtaining module 401 is configured for obtaining webpage visiting information on a plurality of webpages from each of multiple users in a period of time.

The determination module 402 is configured for determining a similarity of each pair of users among the multiple users, and for determining one or more most-similar users based on the similarity of each pair of users among the multiple users.

The calculating and generating module 403 is configured for calculating recommendation probabilities of clicking paths based on the one or more most-similar users and generating a pre-reading list according to the recommendation probabilities of clicking paths.

The second pre-reading module 404 is configured for searching clicking paths relating to a current webpage from the pre-reading list, and pre-reading data of one or more target webpages to be browsed based on the obtained clicking paths. The details on the functionalities of these modules and interactions among the modules may refer to various embodiments described above.

Further, the information obtaining module 401 includes a preprocessing module configured for performing a data cleaning process to screen the webpage visiting information. The determination module 402 includes a similarity calculation module configured for using a cosine similarity method to calculate a similarity of each pair of users among the multiple users.

Further, the determination module 402 includes a filter module for filtering users that have a total webpage visiting number less than a preset webpage visiting threshold number. The determination module 402 includes an inverted list generating module configured for generating an inverted list using a common webpage visited by the multiple users as a common characteristic.

Further, the determination module 402 includes a most-similar user determination module configured for determining one or more users that are most similar to the current user from the multiple users by filtering out the users that has a similarity value less than a similarity threshold value.

Further, the calculating and generating module 403 includes a recommendation probability calculation module configured for calculating a recommendation probability of each clicking path. The calculating and generating module 403 includes a pre-reading list generation module configured for generating a pre-reading list according to the recommendation probabilities of clicking paths.

Accordingly, using the disclosed apparatus for webpage pre-reading, most-similar users can be determined based on the similarity values of different users, and the recommendation probabilities of the clicking paths can be calculated based on the most-similar users to the pre-reading list. The pre-reading list can be searched to find target webpages to be browsed from the current webpage by the most-similar users, and the corresponding webpage data can be pre-read for the current user. Thus, the coverage and hit-rate of the pre-reading can be improved, and a high accuracy and a high efficiency of the pre-reading can be ensured. After the data of webpages that have highly probabilities to be accessed is stored into a local cache, a speed for the user to open the webpages can be greatly enhanced, improving the user experience.

Further, the apparatus illustrated in FIG. 4 can implement any suitable embodiment or combination of embodiments described above, thereby can greatly improve the hit probability and coverage of the predated target webpages, improving the user experience. The various threshold values discussed above can be determined based on any suitable factors, such as the length of the period of time, and the total number of users, etc.

Another aspect of the disclosed subject matter provides a smart terminal including an apparatus for webpage pre-reading described above in connection with FIGS. 3 and 4. A hardware structure of the smart terminal can be referred to the user device 630 described below in connection with FIGS. 6 and 7.

Figure 6:
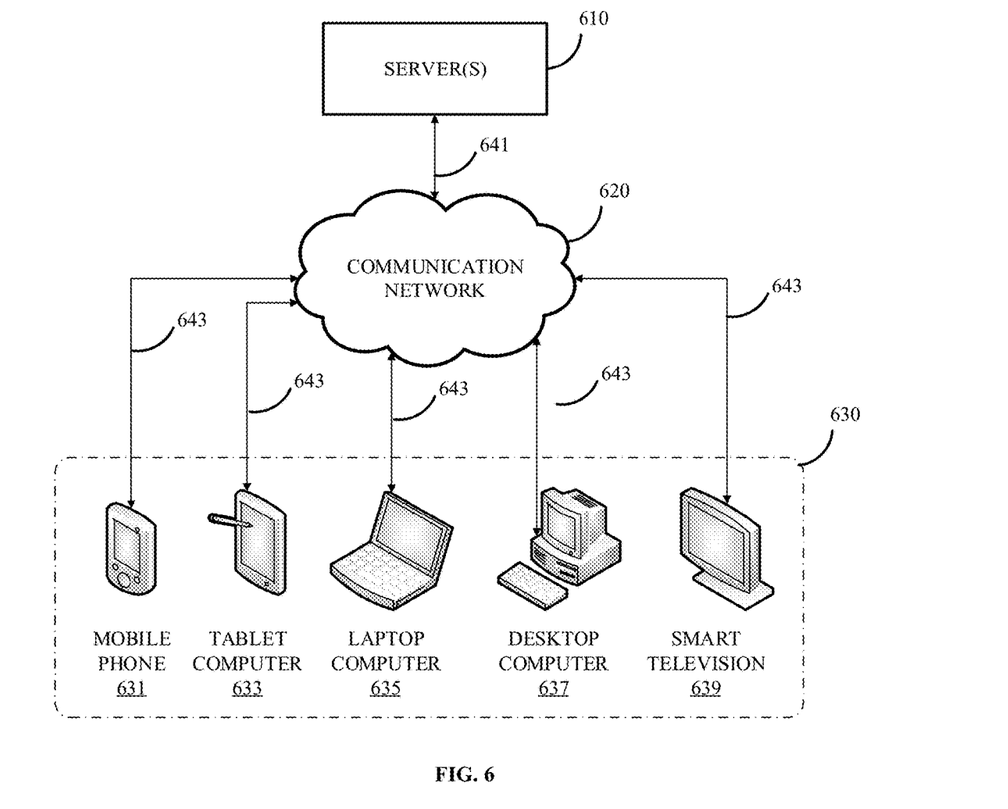
FIG. 6 is a schematic structural diagram of an exemplary system for webpage pre-reading in accordance with some embodiments of the disclosed subject matter.

Referring to FIG. 6, an exemplary system for webpage pre-reading in accordance with some embodiments of the disclosed subject matter is shown. As illustrated, the system can include one or more servers 610, a communication network 620, one or more user device 630, and/or any other suitable component. User devices 630 can be connected by one or more communication links 643 to communications network 620 that can be linked via a communication link 641 to a server 610.

In some embodiments, one or more steps of, or all of, the method for webpage pre-reading described above in connection with FIGS. 1, 2, and 5, can be implemented by one or more suitable hardware processors of server(s) 610, user device(s) 630, and/or other suitable component of the system.

Server(s) 610 and/or user device(s) 630 can include any suitable modules described above in connection with FIGS. 4 and 5.

In some embodiments, communication network 620 can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

User device(s) 630 can include any suitable device that can communicate with one or more severs though communication network 620, receive user query, process and transmit data, and/or present webpages, and/or perform any other suitable function. For example, a user device 630 can be a mobile phone 631, a tablet computer 633, a laptop computer 635, a desktop computer 637, a set-top box, a television 639, a streaming media player, a game console, and/or any other suitable device.

Although five user devices 631, 633, 635, 637, and 639 are shown in FIG. 6 to avoid over-complicating the drawing, any suitable number of these devices, and any suitable types of these devices, can be used in some embodiments.

Server(s) 610 and/or user device(s) 630 can be implemented using any suitable hardware in some embodiments. For example, as illustrated in an exemplary hardware of FIG. 7, such hardware can include a hardware processor 702, memory and/or storage 704, an input device controller 706, an input device 708, display/audio drivers 710, display and audio output circuitry 712, communication interface(s) 714, an antenna 716, and a bus 718.

Figure 7:
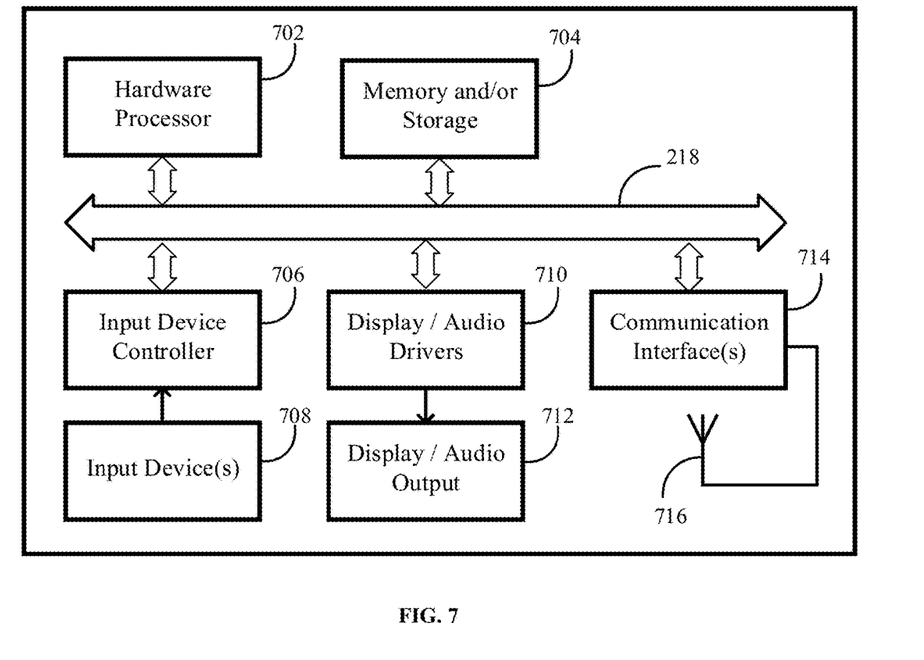
FIG. 7 is a schematic hardware diagram of an exemplary apparatus for webpage pre-reading in accordance with some other embodiments of the disclosed subject matter.

Hardware processor 702 can include any suitable hardware processor, such as a microprocessor, a micro-controller, digital signal processor, dedicated logic, and/or any other suitable circuitry for controlling the functioning of a general purpose computer or special purpose computer in some embodiments.

Memory and/or storage 704 can be any suitable memory and/or storage for storing programs, data, media content, comments, information of users and/or any other suitable content in some embodiments. For example, memory and/or storage 704 can include random access memory, read only memory, flash memory, hard disk storage, optical media, and/or any other suitable storage device.

Input device controller 706 can be any suitable circuitry for controlling and receiving input from one or more input devices 708 in some embodiments. For example, input device controller 706 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 710 can be any suitable circuitry for controlling and driving output to one or more display and audio output circuitries 712 in some embodiments. For example, display/audio drivers 710 can be circuitry for driving an LCD display, a speaker, an LED, and/or any other display/audio device.

Communication interface(s) 714 can be any suitable circuitry for interfacing with one or more communication networks, such as communication network 620 in some embodiments. For example, interface(s) 714 can include network interface card circuitry, wireless communication circuitry, and/or any other suitable circuitry for interfacing with one or more communication networks.

Antenna 716 can be any suitable one or more antennas for wirelessly communicating with a communication network in some embodiments. In some embodiments, antenna 716 can be omitted when not needed. Bus 718 can be any suitable mechanism for communicating between two or more of components 702, 704, 706, 710, and 714 in some embodiments.

Any other suitable components can be included in the hardware in accordance with some embodiments. In some embodiments, any suitable non-transitory computer readable media can be used for storing instructions for performing the method for webpage pre-reading described herein. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A method for webpage pre-reading, comprising:
    obtaining visiting information during a period of time for multiple webpages of each user from a plurality of users including a current user;
    determining a respective similarity values between the current user and each of the plurality of users based on the visiting information;
    determining one or more most-similar users based on the respective similarity value;
    determining a recommendation probability of a clicking path based on each of the one or more most-similar users, by calculating a product of the respective similarity value of each of the one or more most-similar users and a number of clicks from a first webpage to a second webpage and, wherein the first webpage and the second webpage forms the clicking path; and
    when the current user is browsing a current webpage, predicting a target webpage to be accessed by the one or more most-similar users, based on the recommendation probability, as a target webpage for the current user and pre-reading the target webpage.

2. The method of claim 1, further comprising:
    when obtaining the visiting information during the period of time for the multiple webpages of each user from the plurality of users including the current user, performing a data cleaning process to screen the visiting information of each webpage.

3. The method of claim 1, wherein determining the respective similarity value further includes:
    calculating the respective similarity value between the current user and each of the plurality of users using a cosine similarity calculation formula.

4. The method of claim 3, further comprising:
    before calculating the similarity value, filtering users having a webpage visiting number that is less than a webpage visiting threshold number from the plurality of users,
    wherein the webpage visiting number is determined as a lower limit of a confidence interval calculated by using Wilson interval formula.

5. The method of claim 1, further comprising:
    generating an inverted list using a same webpage visited by multiple users as a common characteristic; and
    determining a similarity value between the current user and each of the plurality of users in the inverted list using a cosine similarity calculation formula.

6. The method of claim 5, further comprising:
    when a total number of users included in any inverted list exceeds a user threshold value, removing the exceeding inverted list.

7. The method of claim 1, wherein predicting the target webpage further includes:
    calculating recommendation probabilities of a plurality of clicking paths based on the one or more most-similar users, wherein each of the plurality of clicking paths is from the current webpage;

generating a pre-reading list including a subset of the plurality of clicking paths according to the recommendation probabilities of the plurality of clicking paths; and searching the pre-reading list based on the current webpage to determine the target webpage to be accessed.

8. The method of claim 7, wherein calculating the recommendation probabilities further includes:

obtaining a number of clicks by a most-similar user of the one or more most-similar users from the first webpage to the second webpage, the first webpage and the second webpage forming the clicking path; and calculating a product of the number of clicks and a similarity value between the most-similar user and the current user as a recommendation probability of the clicking path.

9. The method of claim 8, further comprising:

when multiple most-similar users click from the first webpage to the second webpage, calculating a sum of the recommendation probability of the click path of the multiple most-similar users as the recommendation probability of the clicking path.

10. The method of claim 8, further comprising:

filtering any clicking path having a number of clicks less than a clicking number threshold.

11. The method of claim 7, further comprising:

ranking the subset of the plurality of clicking paths in the pre-reading list in a descending order based on the recommendation probabilities of the plurality of clicking paths, wherein pre-reading the target webpage further includes:

pre-reading a target webpage corresponding to a clicking path having a largest recommendation probability; or pre-reading multiple target webpages corresponding to multiple clicking paths ranked in order based on their recommendation probabilities.

12. The method of claim 7, further comprising:

filtering any clicking path having a recommendation probability less than a recommendation probability threshold.

13. An apparatus for webpage pre-reading, comprising:

an information obtaining module configured for obtaining visiting information during a period of time for multiple webpages of each user from a plurality of users including a current user;

a determination module configured for determining a respective similarity value between the current user and each of the plurality of users based on the visiting information, and determining one or more most-similar users based on the respective similarity value;

a calculating and generating module configured for determining a recommendation probability of a clicking path based on each of the one or more most-similar users, by calculating a product of the respective similarity value of each of the one or more most-similar users and a number of clicks from a first webpage to a second webpage and, wherein the first webpage and the second webpage forms the clicking path;

an analysis module configured for, when the current user is browsing a current webpage, predicting a target webpage to be accessed by the one or more most-similar users as a target webpage for the current user; and a first pre-reading module configured for pre-reading the target webpage.

14. The apparatus of claim 13, wherein the information obtaining module includes:

a preprocessing module configured for performing a data cleaning process to screen the visiting information of each webpage.

15. The apparatus of claim 13, wherein the determination module includes:

a filter module configured for filtering a user corresponding to a webpage visiting number that is less than a webpage visiting threshold number; and a similarity calculation module configured for using a cosine similarity calculation formula to calculate the similarity value between the current user and each of the plurality of users.

16. The apparatus of claim 13, wherein the determination module further includes:

an inverted list generating module configured for generating an inverted list including a subset of the plurality of users that have visited a same webpage visited by the current user; and a most-similar user determination module configured for determining a similarity value between the current user and each user in the inverted list.

17. The apparatus of claim 13, wherein the calculating and generating module is further configured for:

calculating recommendation probabilities of a plurality of clicking paths based on the one or more most-similar users, wherein each clicking path is from the current webpage; and generating a pre-reading list including a subset of the plurality of clicking paths according to the recommendation probabilities of the plurality of clicking paths.

18. The apparatus of claim 17, wherein the calculating and generating module is further configured for:

obtaining a number of clicks by a most-similar user of the one or more most-similar users from the first webpage to the second webpage, the first webpage and the second webpage forming the clicking path;

calculating a product of the number of clicks and a similarity value between the most-similar user and the current user as a recommendation probability of the clicking path; and when multiple most-similar users click from the first webpage to the second webpage, calculating a sum of the recommendation probability of the click path of the multiple most-similar users as the recommendation probability of the clicking path.

19. The apparatus of claim 17, further comprising a second pre-reading module configured for:

searching the pre-reading list based on the current webpage to determine the target webpage to be accessed; and pre-reading data of the target webpage to be accessed.

20. The apparatus of claim 19, the second pre-reading module being further configured for:

ranking the subset of the plurality of clicking paths in the pre-reading list in a descending order based on the recommendation probabilities of the plurality of clicking paths, wherein pre-reading the target webpage further includes:

pre-reading a target webpage corresponding to a clicking path having a largest recommendation probability; or pre-reading multiple target webpages corresponding to multiple clicking paths ranked in order based on their recommendation probabilities.

* * * * *